Feb. 16, 1932. E. J. KEARNEY 1,845,797
FLUID OPERATED MEANS FOR SUPPORT MOVEMENTS
Filed Sept. 18, 1926
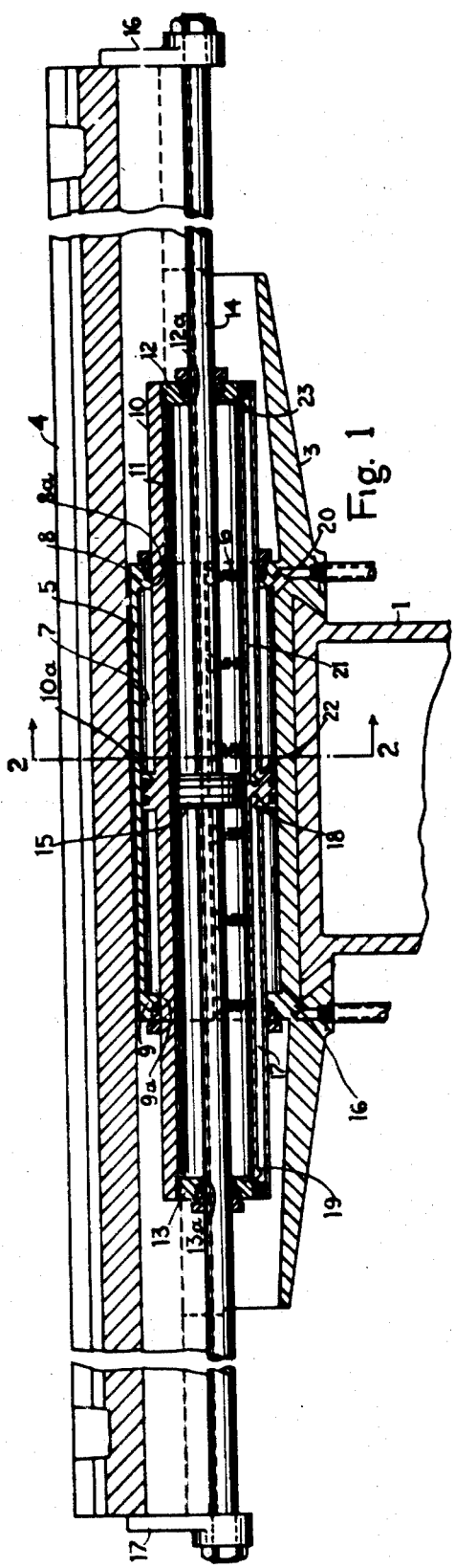
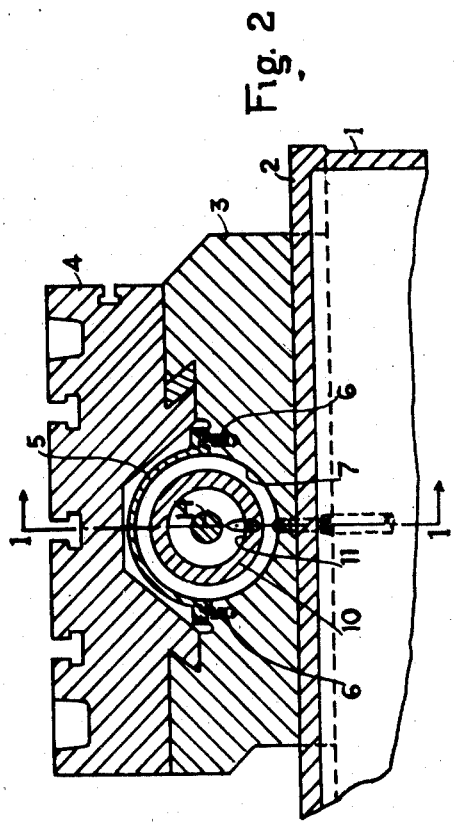
INVENTOR
Edward J Kearney
BY
Fred G Parsons
ATTORNEY Patented Feb. 16, 1932

1,845,797

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

FLUID OPERATED MEANS FOR SUPPORT MOVEMENTS

Application filed September 18, 1926. Serial No. 136,247.

This invention relates to improved means for the movement of machine tool supports, and more particularly to the movement of such supports hydraulically.

A main object of the invention is to provide hydraulic means for support movement of a nature permitting a maximum distance of movement with a minimum of space occupied by the mechanism required.

A further object is to provide a hydraulic cylinder device capable of operation in restricted space and to combine such a device into a unitary structure for supporting and operating a machine tool table or other machine tool support.

Other objects will be apparent from the accompanying drawings, description and claims.

The invention consists in certain novel features of construction and arrangement and in the combination of parts as hereinafter described and as particularly claimed. In the drawings like reference characters have been used to identify the same parts in each view.

Fig. 1 is a vertical section taken along line 1—1 of Fig. 2 through a machine tool table or work support and the supporting structure therefor, to which my invention has been applied.

Fig. 2 is a vertical transverse section along line 2—2 of Fig. 1.

A support 1, of which only a portion is shown and which may be the stationary bed of a machine tool, or may be a movable support, as for instance the vertically movable knee of a milling machine, provides a well known form of top plate 2 having a slide or guide for supporting and guiding a saddle or support 3, movable thereon to right or left in Fig. 2. Saddle 3 provides guideways of well known form slidably supporting a table or work support 4 for movement to right or left in Fig. 1. The mechanism for moving the supports other than the table is not shown since it may be of any well known form or may be of a modified form of the mechanism herein described for movement of the table.

A member 5 is rigidly fixed with saddle 3 by the means of screws 6, and a bore 7 is provided, the axis of which is parallel with the line or path of movement of table 4 relative to saddle 3. The bore 7 is provided with end walls or portions 8 and 9 which are provided with bores 8a and 9a concentric with the bore 7 and within which a member 10 is closely but slidably fitted for movement parallel with the movement of the table. An enlarged portion 10a of member 10 is closely but slidably fitted in the bore 7 forming a plunger or piston, for which the member 10 forms a piston rod, projecting at each end from the cylinder formed by the bore 7 and the end walls 8 and 9.

The member 10 is provided with a bore 11 concentric with the exterior guide surface of the member 10 and therefore retained in a position axially parallel with the movement of table 4 in any position of-the movement of member 10. The bore 11 is provided with end walls 12 and 13 which for convenience in the present instance consist of plates in threaded engagement with threaded end portions of bore 11. End plates 12 and 13 are provided with bores 12a and 13a in axial alignment with the axes of bore 11 and within which a piston rod 14 is closely but slidably fitted for movement parallel with the movement of table 4. An enlarged portion or member 15 fixed on rod 14 is closely but slidably fitted in the bore 11 forming a plunger or piston of relatively small diameter, for which the member 10 together with its end walls forms a movable cylinder. Rod 14 is fixed at opposite ends with brackets 16 and 17 which in turn are fixed with table 4 whereby the table, rod 14 and piston 15 are fixed together for movement.

The bores 8a, 9a, 12a and 13a are each provided with suitable packing to prevent leakage of fluid, and the pistons are each provided with suitable piston rings, but such packing and rings being of well known form is not described in detail.

A fluid channel 16 communicates with the interior of the bore 7 at the one end of the bore always to the one side of the piston 10a. A fluid channel 17 is provided in the wall of member 10 and at a point near the piston 10a may receive fluid from bore 7 through an opening or channel 18. Channel 7 communicates with the interior of bore 11 through an opening 19 near the end of bore 11 and always to the one side of the piston 15.

In a similar manner a fluid channel 20 always communicates with the bores 7 and 11 to the other side of pistons 10a and 15, there being a channel 21 in the wall of member 10 and having an opening or channel 22 spaced close to piston 10a and another opening or channel 23 near the end of bore 11.

If fluid under pressure is supplied to the channel 16 by any of several well known means the pistons 10a and 15 will each be forced to move toward the right in Fig. 1 and the table will be moved toward the right, the piston 15 being connected directly with the table through the rod 14 and brackets 16 and 17 and the piston 10a being connected with piston 15 through the member 10 and the fluid contained therein, whereby both pistons may simultaneously act on the table, and such movement may be continued until both have moved to the full extent of their travel, whereby table 4 will be moved to the right a distance equal to the combined travel of both pistons, any fluid to the right of the pistons being forced out through channel 20.

If fluid under pressure is supplied to the channel 20 the pistons 10a and 15 will each be moved to the left in Fig. 1 and may move the table to the left a distance equal to the combined distance of travel of both pistons, any fluid to the left of either piston being forced out through channel 16.

When both pistons are in motion each cylinder accepts a portion of the total fluid supplied in accordance with the rate of its movement, but the combined movement of both pistons, and of the table is proportionate to the rate at which fluid is supplied.

In either direction of movement, if one of the pistons reaches the limit of its travel before the other, the other will then be acted upon by the full volume of fluid supplied and the table will continue to move until such other piston has also reached the limit of its travel, and if the pistons are each of the same effective area as here shown the rate of table movement for a given rate of fluid supply will be the same whether both pistons or one only are in motion. It will be noted that the arrangement shown in reality and effect consists of four cylinders and pistons arranged for two to act simultaneously in alternative directions of table travel, although for convenience they have been described as two devices, which in another sense they also are, because of the structural combination.

By the arrangement shown a relatively great table travel may be had with a relatively small length of table, while maintaining an actuation cylinder mechanism which is confined between the planes of the two ends of the table in all table positions. Other advantages of the construction shown will also be apparent.

It is preferable that the effective combined area of the two pistons should be substantially the same for each direction of movement and it is partly for this reason that the member 10 and the rod 14 each project from both ends of the respective cylinders. The effective piston area being the same for each direction, the channels 16 and 20 may be joined through power operable fluid control means capable of fluid movement in either direction, such for instance as the fluid control means shown in my co-pending application, Serial No. 114,116, filed June 7, 1926, to form a closed fluid system, whereby fluid forced out by either direction of piston movement is returned to the other side of the pistons, although such a closed system is not necessary and any suitable means of fluid supply may be used.

Having now fully disclosed my invention in a preferred form, I claim:

1. In a machine tool, the combination of a first support, a first cylinder of relatively large bore fixed with said support and having end walls each provided with aligned bores, a second cylinder having a relatively small outside diameter, slidably guided at each end in said aligned bores and having an enlarged portion forming a piston slidably fitted within the relatively large bore of said first cylinder, said second cylinder having end walls each provided with aligned bores, a second support movable relative to said first support, a piston movable within said second cylinder, and a piston rod for the last named piston slidably guided at each end in the aligned bores of the end walls of said second cylinder, said piston rod being fixed with said second support.

2. A mechanism of the nature disclosed comprising an inner cylinder having a bore and having end walls, an enlarged exterior piston portion fixed with said inner cylinder for cooperation with an outer cylinder and spaced between the planes of said end walls, a fluid channel communicating with the bore of said inner cylinder through an inner opening adjacent one of said end walls and having an exterior opening adjacent said enlarged piston portion, and a second fluid channel communicating with said inner cylinder through an inner opening adjacent the other of said end walls and having an exterior opening adjacent said enlarged piston portion, said exterior openings being spaced adjacent opposite ends of said enlarged piston portion.

3. A mechanism of the nature disclosed comprising a plurality of cylinders, an exterior wall of one of said cylinders forming a movable piston rod for the other cylinder, a piston in each of said cylinders each forming together with its cylinder a variable volume chamber, and fluid passages interconnecting said chambers including a fluid channel extending through a substantial portion of said exterior wall in the direction of movement thereof.

4. In a machine tool having a movable support, the combination of support moving means of fluid operated type including a first cylinder and piston forming a first motor device, a second cylinder and piston forming a second motor device, motion transmitting connections from each of said devices to said support and adapted for either device to actuate the support and for the one device to continue the movement of said support after the other has reached the limit of its movement, and a source of fluid supply simultaneously connected with both of said devices for support movement in the same direction irrespective of which device is operative, said cylinders being of substantially equal effective cross sectional area, whereby the rate of support movement will be the same irrespective of which of said devices is operating for support movement.

5. In a machine tool having a reciprocatory support, the combination of fluid operable means for moving said support including a first cylinder and piston forming a first motor device, a second cylinder and piston forming a second motor device, motion transmitting connections from each of said devices to said support and adapted in either direction of support movement for either device to actuate said support and for the one device to continue the movement of said support after the other device has reached the limit of its movement, a source of fluid supply, a first channel connection from said source to each of said devices for support movement in the same direction irrespective of which device is operative, and a second channel connection similarly operative on each of said devices for the other direction of support movement, said cylinders being of substantially equal effective cross sectional area, whereby in either direction of support movement the rate of movement will be the same irrespective of which device is operative.

6. In a machine tool having a reciprocatory support the combination of means for movement thereof including an outer cylinder, a hollow piston rod therefor, said piston rod forming an inner cylinder, and a second piston rod within said inner cylinder, said piston rods each having enlarged piston portions dividing the respective cylinders into two chambers at opposite ends thereof, said piston rods each being extended to pass through both chambers of the corresponding cylinder and to project from both ends thereof.

7. A device as specified in claim 6 in which the different rod portions within the different chambers of a given cylinder are of substantially equal cross sectional area, whereby the one chamber of each cylinder will change in volume during piston movement substantially equally with the other chamber of the same cylinder.

8. A device as specified in claim 6 in which the chambers of different cylinders adjacent corresponding ends thereof are connected for simultaneous delivery of fluid thereto and are of substantially equal effective cross sectional area.

In witness whereof I hereto affix my signature.

EDWARD J. KEARNEY.